US008844122B2

(12) United States Patent
Lin

(10) Patent No.: US 8,844,122 B2
(45) Date of Patent: Sep. 30, 2014

(54) ASSEMBLY FIXTURE

(75) Inventor: Jui-pin Lin, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 611 days.

(21) Appl. No.: 13/227,454

(22) Filed: Sep. 7, 2011

(65) Prior Publication Data

US 2013/0055562 A1 Mar. 7, 2013

(51) Int. Cl.
*B23P 19/00* (2006.01)
*H01R 43/20* (2006.01)

(52) U.S. Cl.
CPC .................................... *H01R 43/20* (2013.01)
USPC ........................................................ 29/747

(58) Field of Classification Search
USPC ........ 29/252, 253, 272, 282, 239; 269/43, 45, 269/156
See application file for complete search history.

(56) References Cited

U.S. PATENT DOCUMENTS

| | | | | |
|---|---|---|---|---|
| 2,399,536 A * | 4/1946 | Baum | ............................ | 29/256 |
| 4,009,867 A * | 3/1977 | Diffenderfer | ................ | 254/10.5 |
| 5,018,261 A * | 5/1991 | Markous | ......................... | 29/239 |
| 5,035,049 A * | 7/1991 | Wheeler | ......................... | 29/845 |
| 2010/0140174 A1* | 6/2010 | Bailey et al. | .................. | 210/656 |

* cited by examiner

*Primary Examiner* — Lee D Wilson
*Assistant Examiner* — Nirvana Deonauth
(74) *Attorney, Agent, or Firm* — Cheng-Ju Chiang

(57) ABSTRACT

An assembly fixture is disclosed. The assembly fixture is utilized for assembling a back combined pogo pin which comprises a barrel, a pin head, an elastic element, and a rear stopper. Said assembly fixture comprises a retaining member and a pressing member. The retaining member has an accommodating hole disposed thereon for accommodating the pogo pin that is not assembled yet. The pressing member is mounted on an upper fixing plate and disposed opposite to the retaining member. The pogo pin is assembled all together when the pressing member pushes the unassembled pogo pin. The assembly fixture is simple and can assemble the back combined pogo pin steadily and quickly.

3 Claims, 7 Drawing Sheets

ASSEMBLY FIXTURE

TECHNICAL FIELD OF THE INVENTION

The present invention relates to a fixture used for downstream processing a product, and more particularly, to an assembly fixture used for assembling a pogo pin.

BACKGROUND OF THE INVENTION

Referring to FIG. 10 and FIG. 11, the two figures respectively show a perspective view and an explored view of a back combined pogo pin 40. The pogo pin 40 comprises a barrel 41 having an opening (not shown) at the top thereof, a pin head 42 arranged in the barrel 41 and having a top end protruded out from said opening, a spring 43 arranged in the barrel 41, and a rear stopper 44 blocking the bottom of the barrel 41. The rear stopper 44 has a convex rib 441 enclosed around for closely binding the rear stopper 44 to the bottom of the barrel 41.

When assembling the pogo pin 40, the pin head 42 is penetrated into the barrel 41 and located at the top thereof. The spring 43 is inserted into the barrel 41, and then the rear stopper 44 is pushed into the barrel 41 from the bottom thereof and fastened thereto. In such a manner, the spring 43 can be compressed between the pin head 42 and the rear stopper 44, and the pin head 42 can be extended out from the barrel 41 and also can be retreated into the barrel 41. The above back combined pogo pin 40 is applied to various types of connectors with the retractable pin head 42. Therefore, there is a need to develop an assembly fixture capable of assembling the pogo pin 40 quickly.

SUMMARY OF THE INVENTION

The objective of the present invention is to provide an assembly fixture capable of quickly assembling a back combined pogo pin.

To achieve the above objective, the present invention provides an assembly fixture for assembling a back combined pogo pin which comprises a barrel, a pin head, an elastic element, and a rear stopper. Said assembly fixture comprises a retaining member and a pressing member. The retaining member has an accommodating hole disposed thereon for accommodating the pogo pin that is not assembled yet. The pressing member is mounted on an upper fixing plate and disposed opposite to the retaining member. The pogo pin is assembled all together when the pressing member pushes the unassembled pogo pin.

Above all, the assembly fixture of the present invention can steadily place the unassembled pogo pin into the retaining member and then finish the assembly of the pogo pin by utilizing the pressing member to press the rear stopper of the pogo pin. The assembly fixture is simple and can assemble the back combined pogo pin steadily and quickly.

DETAILED DESCRIPTION OF THE INVENTION

In order to illustrate the techniques, structural features, achieved objectives and effects of the present invention in details, embodiments are provided in conjunction with drawings and are described as follows.

Figure 1:
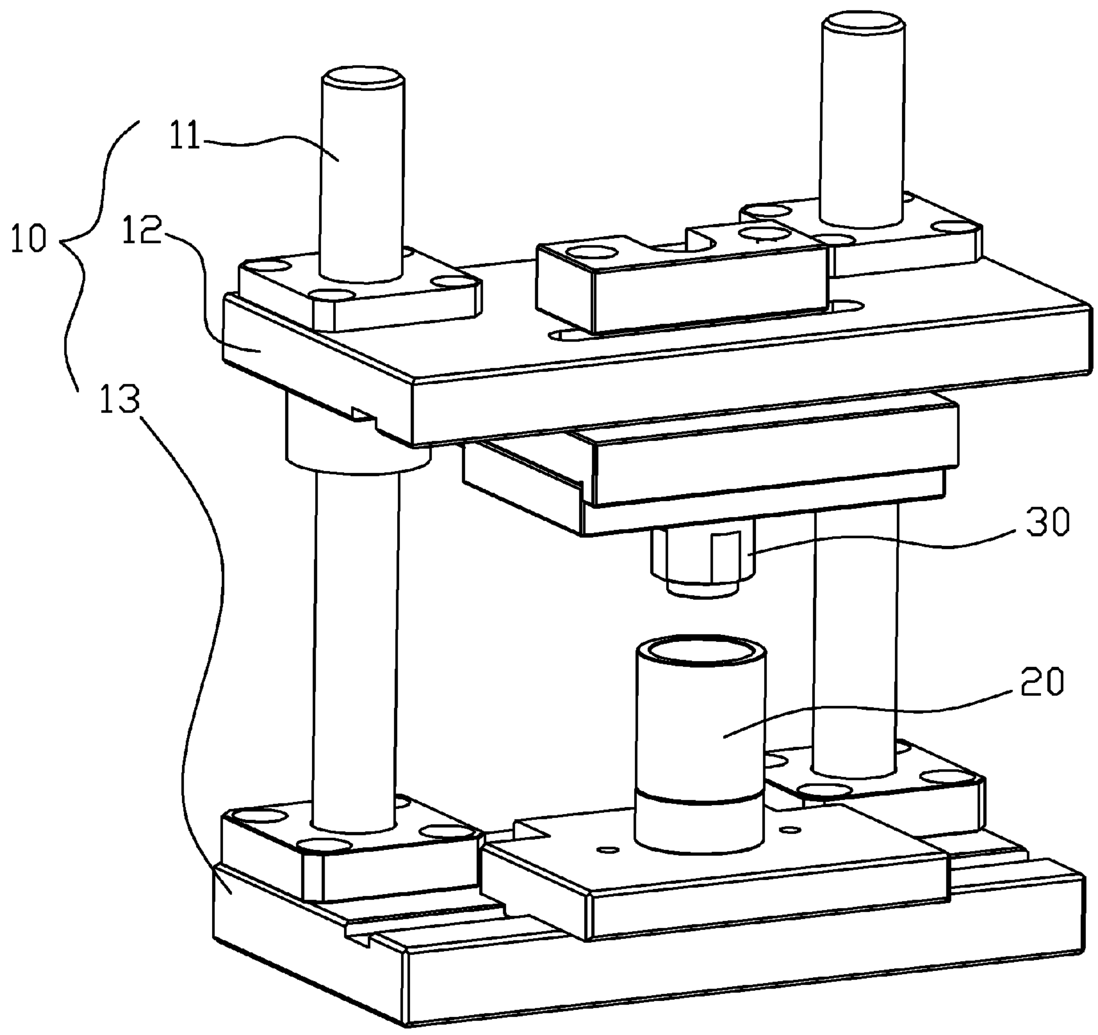
FIG. 1 is a perspective view of an assembly fixture in accordance with one embodiment of the present invention.
Figure 2:
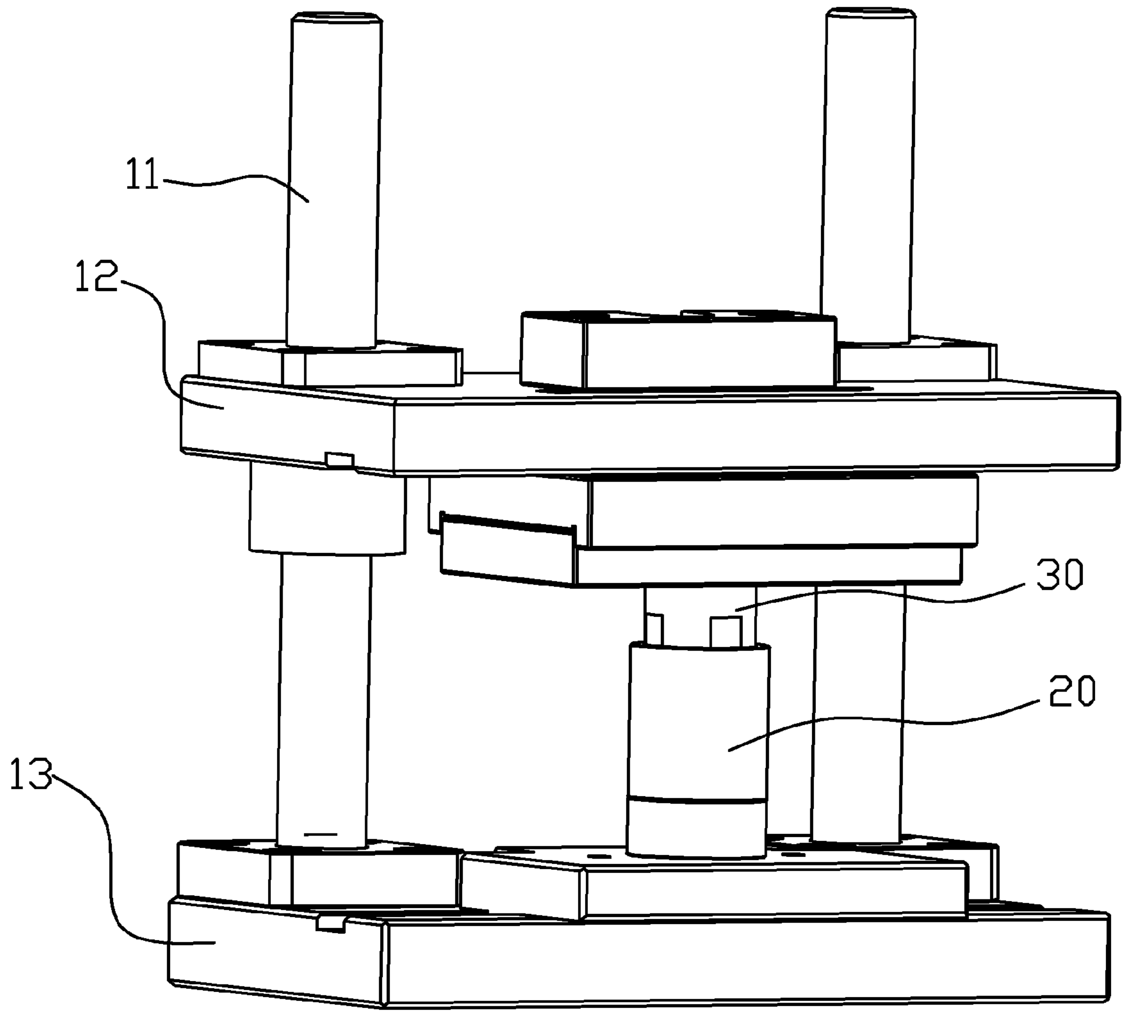
FIG. 2 is a perspective view of another state of the embodiment shown in FIG. 1.

Referring to FIG. 1 and FIG. 2, the assembly fixture of the present invention comprises a rack 10, a retaining member 20, and a pressing member 30.

The rack 10 comprises two guiding columns 11, an upper fixing plate 12, and a lower fixing plate 13. The bottom ends of the two guiding columns 11 are fastened to the lower fixing plate 13. The upper fixing plate 12 is mounted on the two guiding columns 11 and can be slid up and down.

Figure 3:
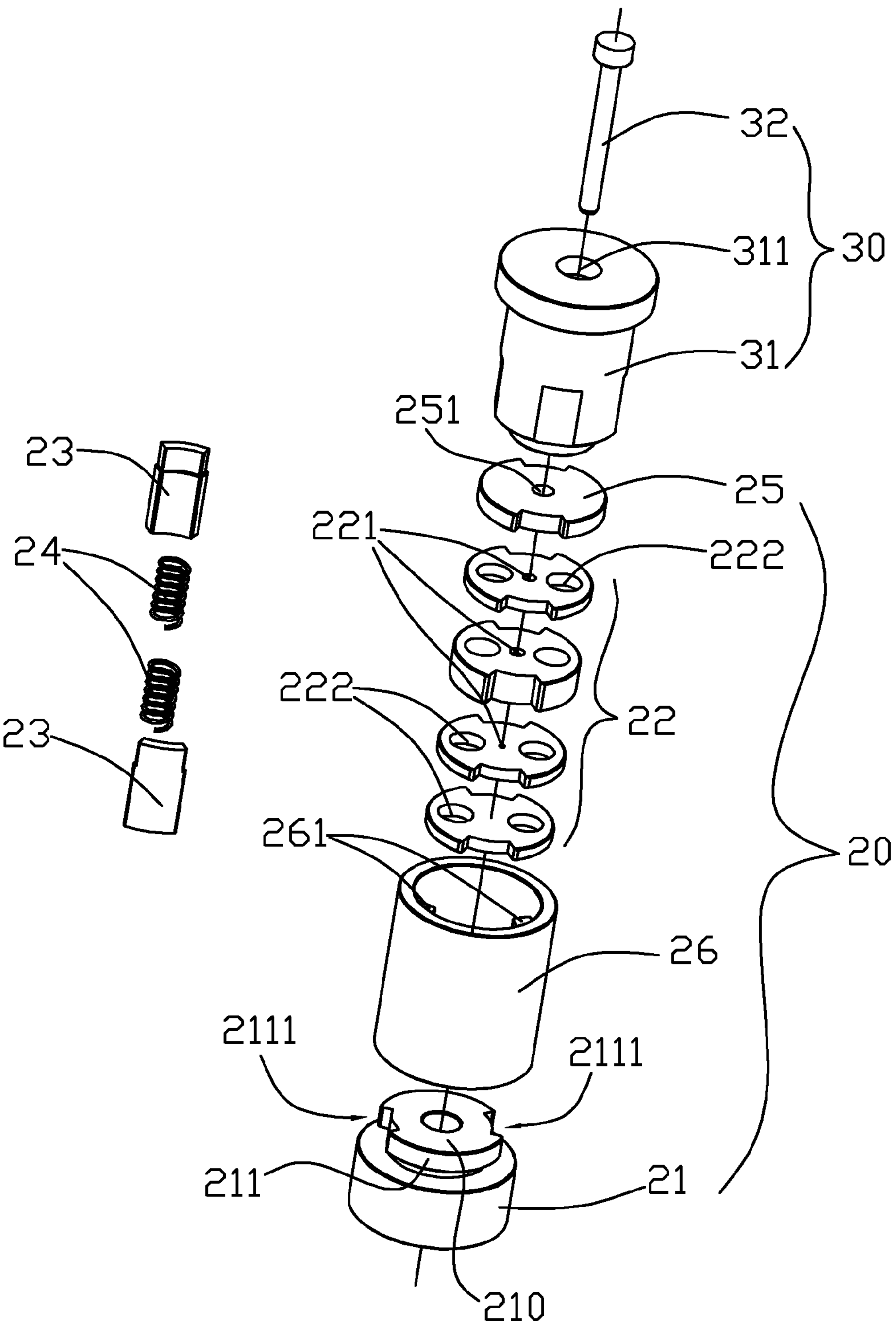
FIG. 3 is an explored view of a retaining member and a pressing member of the assembly fixture shown in FIG. 1.
Figure 4:
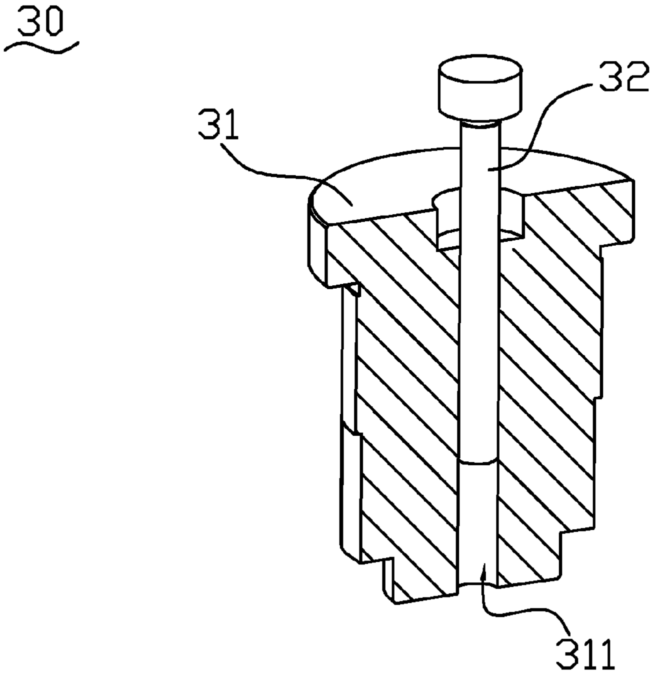
FIG. 4 is a sectional view of the pressing member of the assembly fixture shown in FIG. 1.
Figure 5:
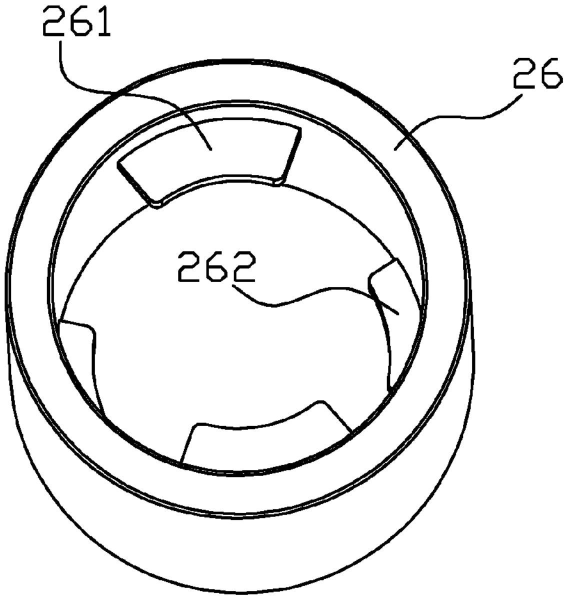
FIG. 5 is a perspective view of a housing of the retaining member of the assembly fixture shown in FIG. 1.
Figure 6:
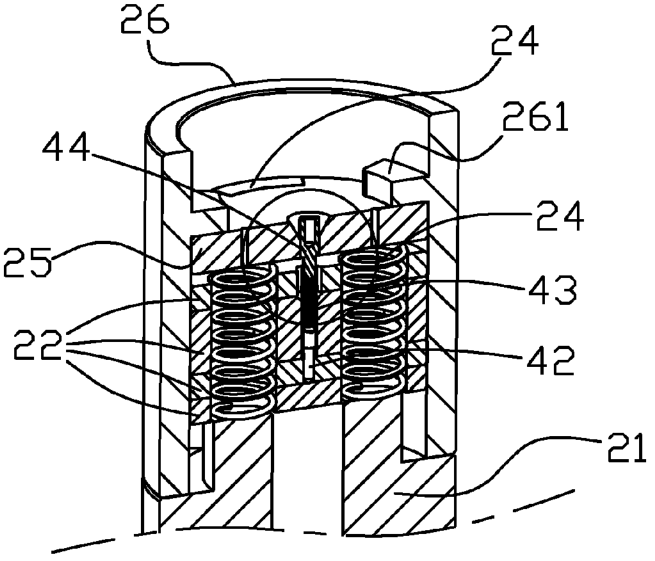
FIG. 6 is a cross-sectional diagram showing that the assembly fixture of the present invention is utilized to assemble a back combined pogo pin that is not assembled yet.
Figure 7:
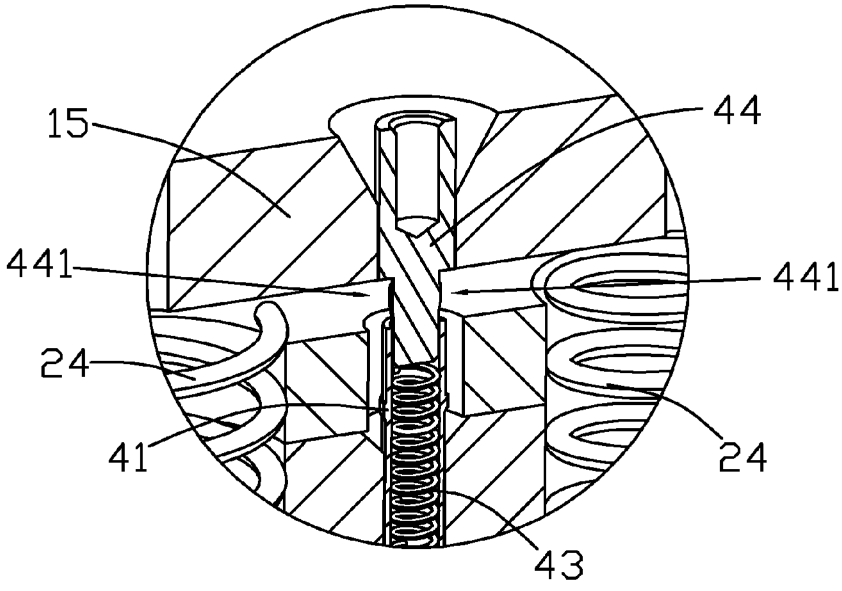
FIG. 7 is a partial enlarged view of FIG. 6.
Figure 8:
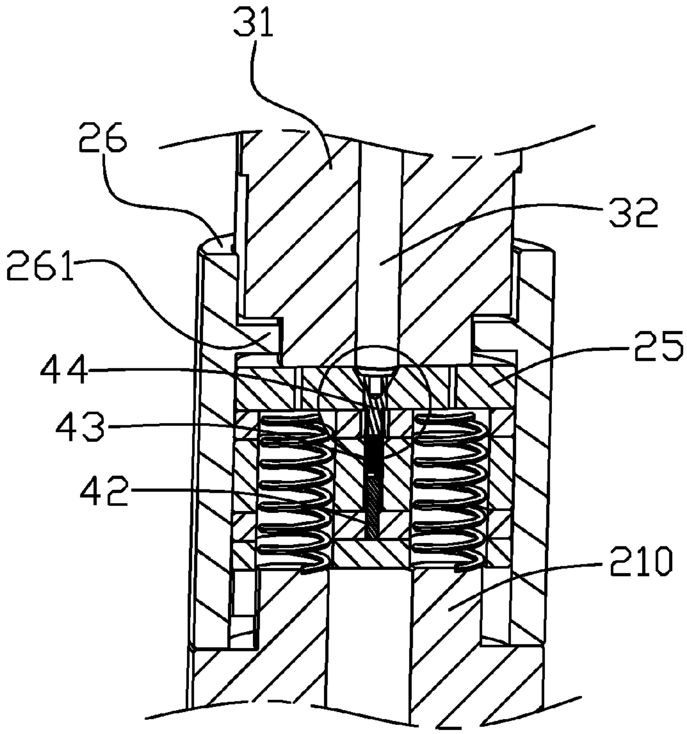
FIG. 8 is a cross-sectional diagram showing a state when assembling by utilizing the assembly fixture of the present invention.
Figure 9:
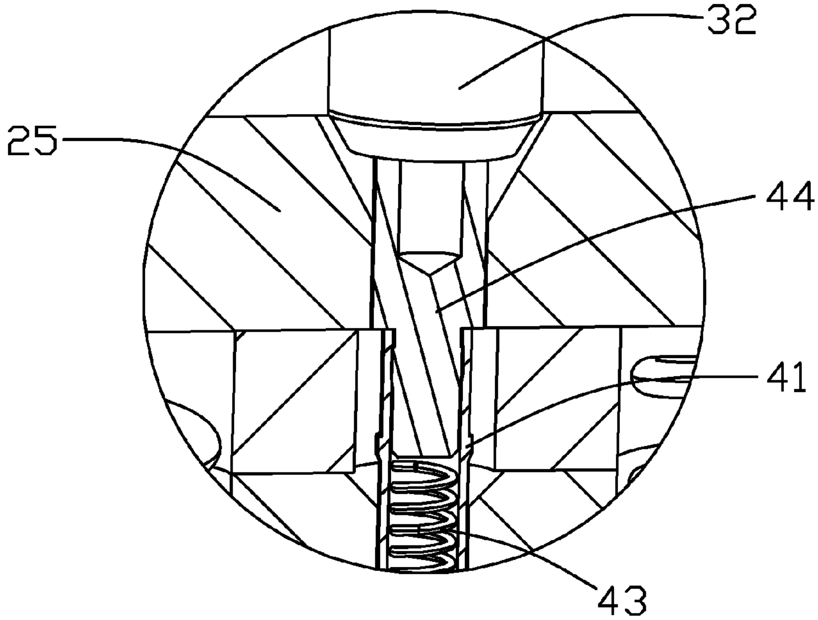
FIG. 9 is a partial enlarged view of FIG. 8.
Figure 10:
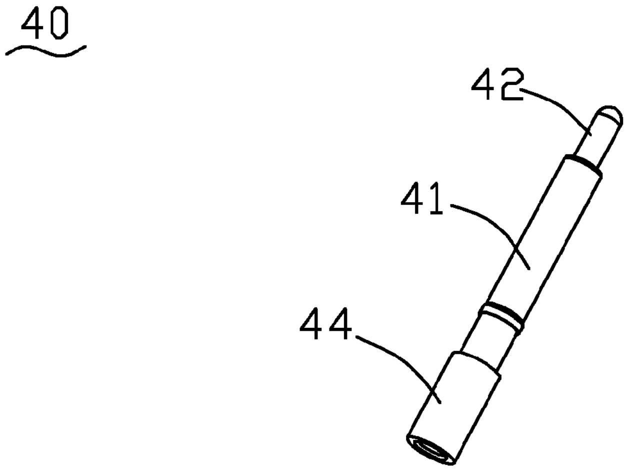
FIG. 10(Prior Art)
FIG. 10 is a perspective view of a back combined pogo pin.
Figure 11:
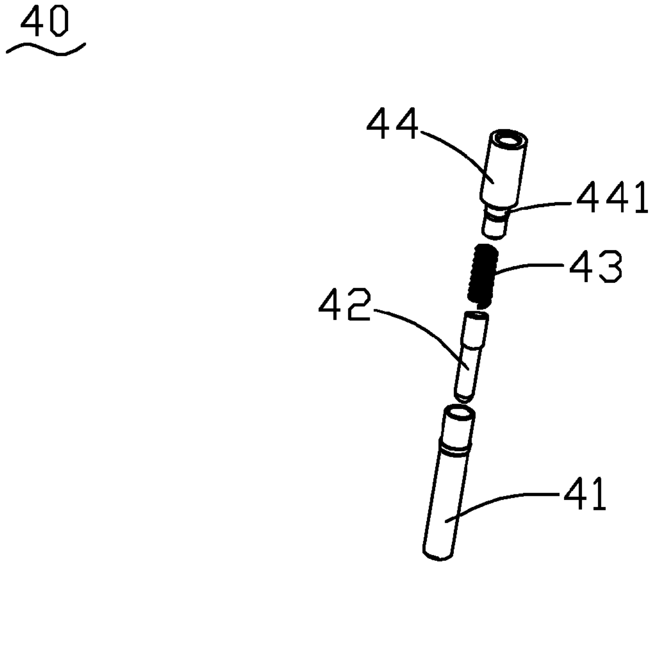
FIG. 11(Prior Art)
FIG. 11 is an explored view of the back combined pogo pin shown in FIG. 10.

Referring to FIG. 3, FIG. 4, and FIG. 5, the retaining member 20 is disposed on the lower fixing plate 13 and fastened thereto. The retaining member 20 comprises a housing 26, a stand 21 mounted at a lower side of the housing 26, a plurality of pads 22 mounted inside the housing 26, two sticking bulks 23, two buffer springs 24, and a top bulk 25. The stand 21 is fastened to the lower fixing plate 13. The stand 21 has a pillar 210 protruding upward from a center portion of the top of the stand 21. The pillar 210 has an eave 211 protruding outward from the circumference of the top of the pillar 210. The eave 211 has two breaches 2111 arranged thereon and the two breaches 211 are centrally symmetrical. The pads 22 are sequentially laid on the stand 21. The pads 22 are all perforated to form accommodating holes 221 for accommodating the barrel 41 and the pin head 42 of the back combined pogo ping 40 that is not assembled yet. Each pad 22 is perforated to form two via holes 222 that are centrally symmetrical. Each pad 22 also has two central symmetric slots (not labeled) arranged in a direction perpendicular to the two via holes 222. The top bulk 25 has a funnel-shaped pressing hole 251 disposed at a center thereof and the pressing hole 251 penetrates the top bulk 25. The pressing hole 251 is utilized for holding the rear stopper 44 of the pogo pin 40. The top bulk 25 also has two central symmetric slots (not labeled) arranged thereon. The two sticking bulks 23 are stuck in the slots for ensuring position stabilization of the pads 22 and the top bulk 25 as a whole. The housing 26 has two position limiting bulks 261 disposed at the top thereof and the two position limiting bulks 261 are protruded from the inner wall to the inner space of the housing 26. The bottom wall of the housing 26 is protruded inward to form two engaging bulks 262 matching the eave 211 of the stand 21.

When assembling the retaining member 20, the breaches 2111 of the stand 21 are aligned with the engaging bulks 262 at the bottom of the housing 26. Then, push the pillar 210 of the stand 21 into the housing 26 and rotate the stand 21 such that the engaging bulks 262 are clamped at the bottom of the eave 211 of the stand 21. The plural pads 22 are sequentially placed into the housing 26 from above thereof. Specifically, the slots are aligned with the position limiting bulks 261. After filling the pads 22 into the housing 26, rotate the pads 22 such that the slots of the pads 22 are aligned with each other and the via holes 222 are aligned as well. The two sticking bulks 23 are stuck in the slots. The two buffer springs 24 penetrates the via holes 222 and are placed therein. Finally, the slots of the top bulk 25 are aligned with the position limiting bulk 261. After filling the top bulk 25 into the housing 26, rotate the top bulk 25 such that the bulk 25 is clamped in the housing 26. At the moment, the two buffer springs 24 are at a free state. The top bulk 25 and one pad 22 adjacent thereto are separated for a certain distance under the tension of the buffer springs 24.

Referring to FIG. 3, the pressing member 30 is disposed on the upper fixing plate 12 and fastened thereto. The pressing member 30 is located at a position corresponding to the retaining member 20. The pressing member 30 has a pressing bulk 31 and a pressing rod 32. The pressing bulk 31 has a through hole 311 penetrating the pressing bulk 31 at a center thereof. The pressing rod 32 is disposed in the through hole 32 and penetrated thereto.

Referring to FIGS. 6 to 9, the assembly fixture of the present invention is applied to assemble the pogo pin 40. When the pressing member 30 is not pressed down yet, place the unassembled pogo pin 40 into the accommodating hole 221 of the retaining member 20. Specifically, place the barrel 41 into the accommodating hole 221 and then fill the pin head 42 and the spring 40 sequentially into the barrel 41 in the accommodating hole 221. The top end of the pin head 42 is extended out from an opening of the barrel 41. The spring 40 presses the pin head 42 at an end thereof. Next, the rear stopper 44 is placed at the bottom opening of the barrel 41 through the pressing hole 251 of the top bulk 25. At the moment, the top bulk 25 and the adjacent pad 22 are separated for a certain distance under the tension of the buffer springs 24 since the two buffer springs 24 are at a free state. The top surface of the top bulk 25 is pressed against the bottom surface of the position limiting bulk 261. The rear stopper 44 does not completely block the bottom of the barrel 41 at the instant. When the upper fixing plate 12 drives the pressing member 30, the top bulk 25 is forced down such that the bottom surface of the top bulk 25 is pressed against the adjacent pad 22 and the rear stopper 44 is squeezed into the barrel 41, and thereby finishing the assembly of the pogo pin 40. After the assembly, the upper fixing plate 12 drives the pressing member 30 back to the original position. It is ready for another assembly after withdrawing the assembled pogo pin 40.

It is noted that the arrangement of the pressing rod 32 is beneficial for being replaced since the bottom surface of the pressing rod 32 may be worn after punching or stamping repeatedly. In addition, the rear stopper 441 has a convex rib 441 located at a portion inserting to the barrel 41 and the convex rib 441 is extended outward from the surface of the rear stopper 441. The arrangement of the convex rib 441 is for ensuring that the rear stopper 441 can be bound closely to the barrel 41 when stamping or punching the rear stopper 441 into the barrel 41.

Above all, the assembly fixture of the present invention can steadily place the unassembled pogo pin 40 into the retaining member 20 and then finish the assembly of the pogo pin 40 by utilizing the pressing member 30 to press the rear stopper 44 of the pogo pin 40. The assembly fixture is simple and can assemble the back combined pogo pin 40 steadily and quickly.

What is claimed is:

1. An assembly fixture, for assembling a back combined pogo pin which comprises a barrel, a pin head, an elastic element, and a rear stopper, said assembly fixture comprising:

a retaining member having an accommodating hole disposed thereon for accommodating the pogo pin that is not assembled yet; and a pressing member mounted on an upper fixing plate and disposed opposite to the retaining member, the pogo pin is assembled all together when the pressing member pushes the unassembled pogo pin;

wherein the retaining member comprises a housing, a stand mounted at a lower side of the housing, a plurality of pads mounted inside the housing, two sticking bulks, two buffer springs, and a top bulk, wherein said accommodating hole is disposed on the pads and the top bulk all together.

2. The assembly fixture according to claim 1, further comprising a rack which comprises the upper fixing plate, a lower fixing plate, and two guiding columns, the lower fixing plate is fastened to bottom ends of the guiding columns, the guiding columns perforate the upper fixing plate which can be slid up and down, the pressing member is disposed on the upper fixing plate and fastened thereto, the retaining member is disposed on the lower fixing plate and fastened thereto.

3. The assembly fixture according to claim 1, wherein the pressing member comprises a pressing bulk and a pressing rod perforating the pressing bulk, the pressing bulk has a through hole penetrating the pressing bulk at a center thereof, the pressing rod is disposed in the through hole and penetrated thereto.

* * * * *